United States Patent
Gremaud et al.

(10) Patent No.: US 12,519,868 B2
(45) Date of Patent: Jan. 6, 2026

(54) METHOD FOR NOTIFYING AT LEAST ONE CLIENT MODULE IMPLEMENTED IN A WIRELESS DEVICE, CORRESPONDING COMPUTER PROGRAM PRODUCT AND DEVICES

(71) Applicant: NAGRAVISION Sàrl, Cheseaux-sur-Lausanne (CH)

(72) Inventors: Fabien Gremaud, Cheseaux-sur-Lausanne (CH); Juan-Ramon Hernandez, Madrid (ES); Frédéric Thomas, Cheseaux-sur-Lausanne (CH); Gilles Russ, Cheseaux-sur-Lausanne (CH); Luc Devallonné, Cheseaux-sur-Lausanne (CH)

(73) Assignee: NAGRAVISION Sàrl, Cheseaux-sur-Lausanne (CH)

( * ) Notice: Subject to any disclaimer, the term of this patent is extended or adjusted under 35 U.S.C. 154(b) by 0 days.

(21) Appl. No.: 18/514,545

(22) Filed: Nov. 20, 2023

(65) Prior Publication Data
US 2024/0171650 A1    May 23, 2024

(30) Foreign Application Priority Data
Nov. 22, 2022    (EP) .................................... 22208701

(51) Int. Cl.
H04L 67/55    (2022.01)
(52) U.S. Cl.
CPC .................... *H04L 67/55* (2022.05)

(58) Field of Classification Search
CPC ... H04L 67/55; H04L 51/224; H04W 52/0209
See application file for complete search history.

(56) References Cited

U.S. PATENT DOCUMENTS

| | | | |
|---|---|---|---|
| 9,690,748 B1 * | 6/2017 | Roy | G06F 16/957 |
| 2013/0190032 A1 * | 7/2013 | Li | H04L 67/56 |
| | | | 455/517 |

(Continued)

OTHER PUBLICATIONS

Extended European Search Report issued Apr. 25, 2023 in European Application 22208701.7 filed on Nov. 22, 2022, 7 pages (with Written Opinion).

*Primary Examiner* — Johnny B Aguiar
(74) *Attorney, Agent, or Firm* — Oblon, McClelland, Maier & Neustadt, L.L.P.

(57) ABSTRACT

A method for notifying at least one client module implemented in a wireless device communicatively connected to a wireless communications network that respective specific data are available in a service module implemented in a server communicatively connected to the wireless communications network. According to the method, a notification client device implemented in the wireless device executes: receiving a notification, sent by a notification service device implemented in a server communicatively connected to the wireless network, including information that, for at least one client module, respective specific data are available in a server communicatively connected to the wireless communications network, and notifying the at least one client module that respective specific data are available in a server.

20 Claims, 2 Drawing Sheets

(56) References Cited

U.S. PATENT DOCUMENTS

| | | | | |
|---|---|---|---|---|
| 2014/0047078 | A1* | 2/2014 | Wilson | H04L 51/214 |
| | | | | 709/219 |
| 2014/0194097 | A1* | 7/2014 | Gaddam | H04W 12/06 |
| | | | | 455/411 |
| 2014/0337405 | A1 | 11/2014 | Athas et al. | |
| 2015/0120849 | A1* | 4/2015 | Thies | H04W 72/53 |
| | | | | 709/206 |
| 2015/0212674 | A1* | 7/2015 | Firstenberg | H04L 67/75 |
| | | | | 715/747 |
| 2016/0219083 | A1 | 7/2016 | Gangadharan et al. | |
| 2017/0164168 | A1 | 6/2017 | Yang et al. | |
| 2017/0359778 | A1* | 12/2017 | Chen | H04M 1/2535 |
| 2020/0076913 | A1* | 3/2020 | Trocki | H04L 67/55 |

* cited by examiner

METHOD FOR NOTIFYING AT LEAST ONE CLIENT MODULE IMPLEMENTED IN A WIRELESS DEVICE, CORRESPONDING COMPUTER PROGRAM PRODUCT AND DEVICES

1. FIELD OF THE DISCLOSURE

The field of the disclosure is that of wireless devices.

More specifically, the disclosure relates to a method for the notification of client modules implemented in such wireless devices, e.g. when updated data are available for the client modules.

The disclosure can be of interest in any field wherein such client modules that needs to be notified are implemented in a wireless device. This is the case for instance for terminal equipment such as smartphones or connected objects like e.g. IoT (for "Internet of Things") objects.

2. TECHNOLOGICAL BACKGROUND

Wireless devices, such as smartphones or IoT devices, are usually made of different client modules from various providers.

In practice, such "module" can be a piece of software running on general purpose hardware capabilities of the wireless device (e.g. a CPU core (for "Central Processing Unit"), a MCU (for "Microcontroller Unit"), a DSP (for "Digital Signal Processing processor"), etc.). This is the case for instance when the client module is an application running on a smartphone. Alternatively, such "module" can directly be a device or system (e.g. including hardware blocks and pieces of software) that is configured for running the client system. For example, basic IoT devices typically integrate a communications module for WIFI or Cellular connectivity. In both cases (i.e. pure software "module" or device type "module"), updates may be required during the life cycle of the wireless device.

In that respect, each module may implement one or more independent connections to different systems. For example, a connectivity module has connection to a vendor specific FOTA (for "Firmware Over-The-Air") system and security system. Alternatively, a MCU has multiple connection usecases like customer specific FOTA system and IoT Management platform for an IoT device. In this later case, the different client modules may be managed with a customer IoT Management platform at application level using for example dedicated remotely managed "IoT resources", e.g. firmware object, but with price of a complex backend integration of the different client modules.

So, usually the different client modules remain independent with multiple "pooling" connections allowing the different client modules to be notified, for example:

from an eUICC (for "Embedded Universal Integrated Circuit Card") of a cellular connectivity module to Operator UICC remote management platform;
from a connectivity module to a module vendor platform;
from an MCU application to a customer IoT platform;
From an MCU or connectivity module to a security platform to manage device security credentials;
. . . .

This leads to multiple connections with impact on the overall wireless device power consumption and communication bandwidth. Such problematic is further critical for IoT devices for which the power consumption is critical and the communication bandwidth is by construction limited.

There is thus a need for a solution for notifying client modules implemented in a wireless device, e.g. for informing the client modules when updated data are available from service providers, that reduces the power consumption and the need in term of communication bandwidth compared to the known techniques for such notification.

3. SUMMARY

A particular aspect of the present disclosure relates to a method for notifying at least one client module implemented in a wireless device communicatively connected to a wireless communications network that respective specific data are available in a service module implemented in a server communicatively connected to the wireless communications network. According to such method, a notification client device implemented in the wireless device executes:

receiving a notification, sent by a notification service device implemented in a server communicatively connected to the wireless network, comprising information that, for at least one client module, respective specific data are available in a server communicatively connected to the wireless communications network; and
notifying the at least one client module that respective specific data are available in a server.

Thus, the present disclosure proposes a new and inventive solution for notifying client modules implemented in a wireless device, e.g. for informing the client modules when updated data are available from service providers.

More particularly, having in the wireless device a notification client device dedicated to receiving the notifications from a notification service device on the network side, in place of having the client module(s) directly receiving the notifications from the service module(s) (e.g. following a "polling" of a respective service module by a client module), allows optimizing the connection between the notification client device and the notification service device through the wireless network in respect of the notifications. Indeed, the client module(s) may implement non-optimized protocols for the exchange of notification data with the network side whereas the notification client device and the notification service device may implement an optimized protocol based on the features of the wireless network. Furthermore, the wake-up of the client module(s) is not required unless a notification directed to such client module(s) is received by the notification client device. Conversely, the power consumption and wake-up protocol of the notification client device can be optimized in that respect. Thus, the power consumption of the wireless device and the needs in term of communication bandwidth is reduced.

In some embodiments, the notification client device executes, before executing said notifying the at least one client module: waking up the at least one client module.

Thus, the wake-up of the client module(s) is executed only when required, thus reducing further the power consumption of the wireless device.

In some embodiments wherein a plurality of client modules is implemented in the wireless device, the notification sent by the notification service device comprises information that, for at least two client modules, respective specific data are available in a server communicatively connected to the wireless communications network. Said notifying comprises notifying each client module of the at least two client modules that respective specific data are available in a server.

Thus, the notification client device centralizes the notification from the different service modules. This allows avoiding the wake-up of the different client module(s) unless a notification directed to such client module(s) is received by the notification client device. Thus, the power consumption of the wireless device is further reduced.

In some embodiments, wherein a plurality of client modules is implemented in the wireless device, the notification sent by the notification service device comprises information that, for each client module of the plurality of client modules, specific data are available in a server communicatively connected to the wireless communications network. Said notifying comprises notifying each client module of the plurality of client modules that respective specific data are available in a server.

Another aspect of the present disclosure relates to a method for notifying at least one client module implemented in a wireless device communicatively connected to a wireless communications network that respective specific data are available in a service module implemented in a server communicatively connected to the wireless communications network. According to such method, a notification service device implemented in a server communicatively connected to the wireless network executes:
  receiving at least one initial notification, sent by a service module implemented in a server communicatively connected to the wireless communications network, comprising information that for a respective client module implemented in the wireless device, respective specific data are available in a server communicatively connected to the wireless communications network; and
  sending a notification, to a notification client device implemented in the wireless device, comprising information that, for the one or more respective client module for which an initial notification has been received, respective specific data are available in a server communicatively connected to the wireless communications network.

In some embodiments wherein a plurality of client modules is implemented in the wireless device, the notification service device receives at least two initial notifications, each initial notification being sent from a respective service module, the initial notification comprising information that for a respective client module of the plurality of client modules, respective specific data are available in a server communicatively connected to the wireless communications network. Said notification sent to the notification client device comprises information that for the two or more respective client modules for which an initial notification has been received, respective specific data are available in a server communicatively connected to the wireless communications network.

In some embodiments wherein a plurality of client modules is implemented in the wireless device, the notification service device receives a plurality of initial notifications, each notification being sent from a respective service module, the initial notification comprising information that for a respective client module of the plurality of client modules, respective specific data are available in a server communicatively connected to the wireless communications network. Said notification sent to the notification client device comprises information that, for each respective client modules of the plurality of client modules for which an initial notification has been received, respective specific data are available in a server communicatively connected to the wireless communications network.

Another aspect of the present disclosure relates to a computer program product comprising program code instructions for implementing the above-mentioned method for notifying at least one client module implemented in a wireless device (in any of the different embodiments discussed above), when the program is executed on a computer or a processor.

Another aspect of the present disclosure relates to a notification client device configured for implementing all or part of the steps of the above-mentioned method for notifying at least one client module implemented in a wireless device as executed by said notification client device (in any of the different embodiments discussed above). Thus, the features and advantages of this device are the same as those of the corresponding steps of said method. Therefore, they are not detailed any further.

Another aspect of the present disclosure relates to a wireless device communicatively connected to a wireless communications network. Such wireless device comprises:
  at least one client module; and
  a notification client device (in any of the different embodiments discussed above) for notifying said at least one client module.

In some embodiments, the wireless device comprises a wireless connectivity system comprising wireless means for allowing the connection of the wireless device to the wireless communications network. The notification client device is implemented in the wireless connectivity system.

Thus, the notification client device can rely more easily on dedicated mechanisms linked to the protocol implemented in the wireless communications network in respect of the sending of notifications to the wireless device from the network side.

In some embodiments, the wireless communications network belongs to the group comprising:
  a WiFi network;
  a cellular network;
  a satellite broadcast network; and
  a low power wide area network dedicated to the internet of things.

Such cellular network is e.g. a 2G/3G/4G/5G . . . 3GPP (for "3rd Generation Partnership Project") cellular network. Such low power wide area network, or LPWAN, is e.g. a NB-IoT network, a LoRa® network or a SigFox® network. In such case, the notification sent by the notification service device can be received following a power optimized protocol usable for such notifications. It can be e.g. a eDRX (for "Extended Discontinuous Reception") and/or PSM (for "Power Saving Mode") protocol or a LoRaWAN protocol.

In some embodiments, the wireless device comprises further wireless means for allowing the connection of the wireless device to a second wireless communications network. The wireless device is configured for having the at least one client module receiving the respective specific data from a server through the second wireless communications network, the server being also communicatively connected to the second wireless communications network.

In some embodiments, the second wireless communications network belongs to the group comprising:
  a WiFi network;
  a satellite broadcast network; and
  a cellular network.

Such cellular network is e.g. a 2G/3G/4G/5G . . . 3GPP cellular network.

Another aspect of the present disclosure relates to a notification service device configured for implementing all or part of the steps of the above-mentioned method for notifying at least one client module implemented in a wireless device as executed by said notification service device (in any of the different embodiments discussed above). Thus, the features and advantages of this device are the same as those of the corresponding steps of said method. Therefore, they are not detailed any further.

4. LIST OF FIGURES

Other features and advantages of embodiments shall appear from the following description, given by way of indicative and non-exhaustive examples and from the appended drawings, of which:

5. DETAILED DESCRIPTION

In all of the figures of the present document, the same numerical reference signs designate similar elements and steps.

Figure 1:
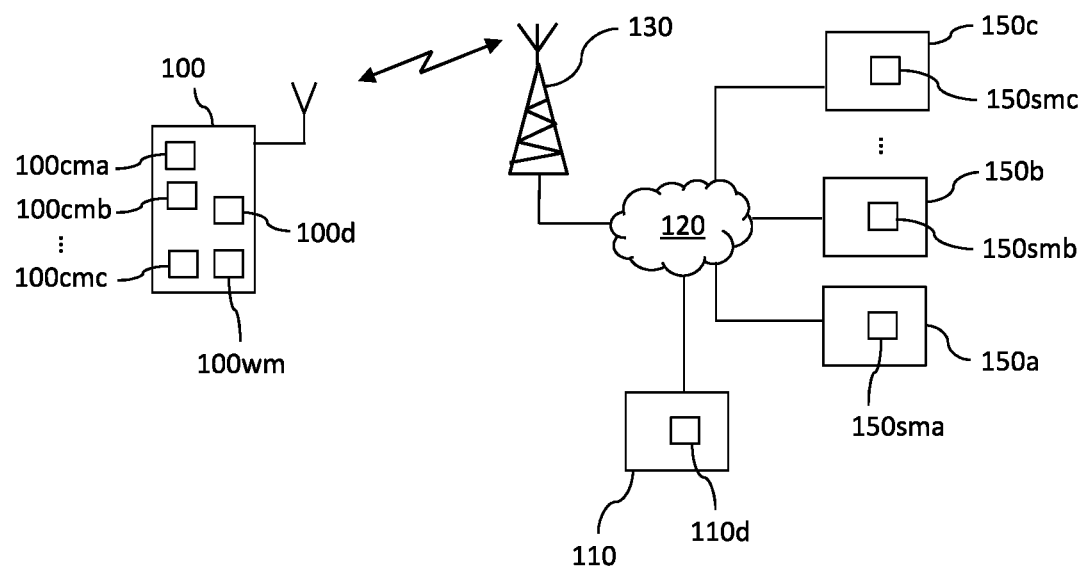
FIG. 1 illustrates a wireless device implementing client modules and different servers both, the wireless device and the servers being communicatively connected to a wireless communications network according to one embodiment of the present disclosure.

Referring now to FIG. 1, we illustrate a wireless device 100 implementing client modules 100*cma*, 100*cmb*, 100*cmc* as well as different servers 110, 150*a*, 150*b*, 150*c*, the wireless device 100 and the servers 110, 150*a*, 150*b*, 150*c* being both communicatively connected to a wireless communications network 120 according to one embodiment of the present disclosure.

More particularly, as detailed above in the section "technological background", such modules can be:
- a piece of software running on general purpose hardware capabilities of the wireless device 100, e.g. an application running on a CPU of the wireless device 100; or
- a device or system (e.g. including hardware blocks and pieces of software) that is configured for running the client, e.g. a communications module (e.g. for WIFI or Cellular connectivity) of the wireless device 100.

In the present embodiment, the wireless device 100 (e.g. a smartphone, an IoT object, a tablet implementing a wireless connectivity module, etc.) implements three client modules 100*cma*, 100*cmb*, 100*cmc*. However, in other embodiments, the wireless device 100 implements any number of client modules 100*cma*, 100*cmb*, 100*cmc*, e.g. only one client module, a plurality of client modules, etc.

Back to FIG. 1, the wireless device 100 is wirelessly communicatively connected to the wireless communications network 120 going through a base station 130. For this, the wireless device 100 comprises a wireless connectivity system 100*wm* comprising wireless means for allowing the connection of the wireless device 100 to the wireless communications network 120. The wireless communications network 120 is a LPWAN dedicated to the internet of things (e.g. a NB-IoT network, a LoRa® network or a SigFox® network). However, in other embodiments, the communication between the wireless device 100 and the core of the wireless communications network 120 goes through e.g. a satellite broadcast network, a WiFi network or a cellular network (e.g. a 2G/3G/4G/5G . . . 3GPP cellular network).

Back to FIG. 1, service providers servers 150*a*, 150*b*, 150*c* comprising respective service module 150*sma*, 150*smb*, 150*smc* are also communicatively connected to the wireless communications network 120. The communication between the service providers servers 150*a*, 150*b*, 150*c* and the core of the wireless communications network 120 goes through a wired communications link, e.g. a xDSL communications link implementing an internet protocol. However, in other embodiments, such communication between the service providers servers 150*a*, 150*b*, 150*c* and the core of the wireless communications network 120 goes through a wireless communications link, e.g. based on a cellular protocol (e.g. a 3GPP 2G, 3G, 4G or 5G protocol) or on a WiMAX protocol.

Back to FIG. 1, one (or more) of the service modules 150*sma*, 150*smb*, 150*smc* is configured for notifying that specific data are available, in the corresponding service providers servers 150*a*, 150*b*, 150*c*, for one (or more) respective client modules 100*cma*, 100*cmb*, 100*cmc*. In that respect, the one (or more) service module 150*sma*, 150*smb*, 150*smc* does not directly notify the one (or more) respective client module 100*cma*, 100*cmb*, 100*cmc* by going through the wireless communications network 120 as usually done in the prior art solutions. Indeed, as detailed more deeply below in relation with FIG. 4, according to the present solution the one (or more) service module 150*sma*, 150*smb*, 150*smc* sends an initial notification to a notification service device 110*d* implemented in a server 110 communicatively connected to the wireless network 120. Responsive to receiving the one (or more) initial notification, the notification service device 110*d* sends a notification to the notification client device 100*d* implemented in the wireless device 100 that, for one (or more) of the client modules 100*cma*, 100*cmb*, 100*cmc* for which an initial notification has been received, respective specific data are available in a service providers server 150*a*, 150*b*, 150*c*.

Having in the wireless device 100 a notification client device 100*d* dedicated to receiving the notifications sent by the notification service device 110*d* on the network side, in place of having the client module(s) 100*cma*, 100*cmb*, 100*cmc* directly receiving respective notification(s) from the service module(s) 150*sma*, 150*smb*, 150*smc* (e.g. following a "polling" of a respective service module by a client module), allows optimizing the connection between the notification client device 100*d* and the notification service device 110*d* through the wireless network 120 in respect of the notifications. Indeed, the client module(s) 100*cma*, 100*cmb*, 100*cmc* may implement non-optimized protocols for the exchange of notification data with the network side whereas the notification client device 100*d* and the notification service device 110*d* may implement an optimized protocol based on the features of the wireless network 120.

For instance, in some embodiments the notification client device 100*d* is implemented in the wireless connectivity system 100*wm*. As such, the notification client device 100*d* can rely more easily on dedicated mechanisms linked to the protocol implemented in the wireless communications network 120 in respect of the sending of notifications to the wireless device 100 from the network side. For instance, when the wireless communications network 120 is a LPWAN, the notification sent by the notification service device 110*d* to the notification client device 100*d* can follow a power optimized protocol usable for such notifications. It can be e.g. a eDRX (for "Extended Discontinuous Reception") and/or PSM (for "Power Saving Mode") protocol or a LoRaWAN protocol.

In some embodiments, the wireless device 100 comprises further wireless means for allowing the connection of the wireless device 100 to a second wireless communications network. In such embodiments, the wireless device 100 is configured for having the client modules 100cma, 100cmb, 100cmc receiving the respective specific data from the corresponding service providers servers 150a, 150b, 150c through the second wireless communications network. In that case, the service providers servers 150a, 150b, 150c are also communicatively connected to the second wireless communications network. For instance, the second wireless communications network is a WiFi network, a satellite broadcast network or a cellular network (e.g. a 2G/3G/4G/5G . . . 3GPP cellular network). Such embodiments are of particular interest e.g. when the wireless communications network 120 used for the notification is a LPWAN, thus providing low bandwidth for the update of the client modules 100cma, 100cmb, 100cmc with the specific data. In such case, a second wireless communications network providing higher bandwidth is preferable for receiving the specific data.

Figure 2:
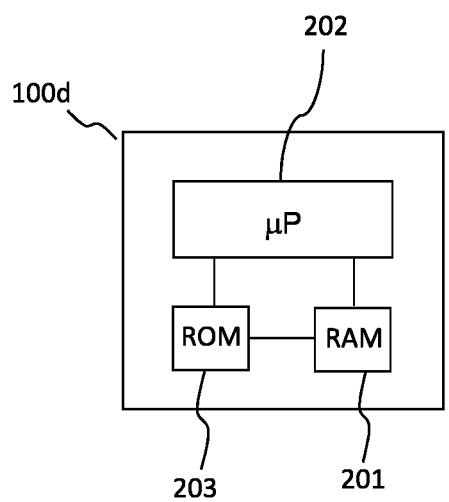
FIG. 2 illustrates an example of the structural blocks of an electronic device allowing steps of the method of FIG. 4 to be executed by the wireless device of FIG. 1 according to one embodiment of the present disclosure.

Referring now to FIG. 2, in order to be able to implement the corresponding steps of the method for notifying at least one client module implemented in a wireless device, in the various embodiments disclosed below in relationship with FIG. 4, in some embodiments the notification client device 100d comprises:
- a non-volatile memory 203 (e.g. a read-only memory (ROM), a hard disk, a flash memory, etc.);
- a volatile memory 201 (e.g. a random-access memory or RAM) and a processor 202.

The non-volatile memory 203 is a non-transitory computer-readable carrier medium. It stores executable program code instructions, which are executed by the processor 202 in order to enable implementation of some steps of the method described below (method for notifying at least one client module implemented in a wireless device) in the various embodiments disclosed below in relationship with FIG. 4.

Upon initialization, the aforementioned program code instructions are transferred from the non-volatile memory 203 to the volatile memory 201 so as to be executed by the processor 202. The volatile memory 201 likewise includes registers for storing the variables and parameters required for this execution.

The steps of the method for notifying at least one client module implemented in a wireless device may be implemented equally well:
- by the execution of a set of program code instructions executed by a reprogrammable computing machine such as a PC (personal computer) type apparatus, a DSP (digital signal processor) or a microcontroller. This program code instructions can be stored in a non-transitory computer-readable carrier medium that is detachable (for example a CD-ROM (compact disc read-only memory), a DVD-ROM (digital versatile disc read-only memory), a USB (universal serial bus) key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

Figure 3:
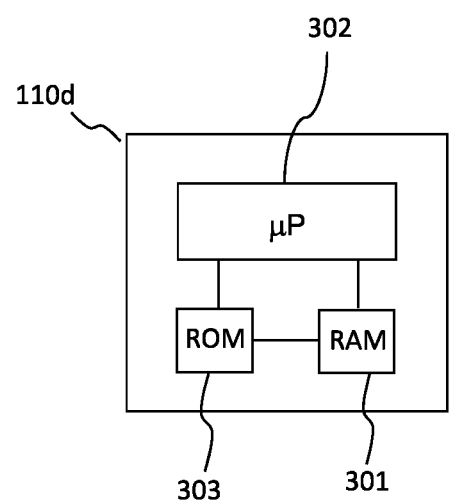
FIG. 3 illustrates an example of the structural blocks of an electronic device allowing steps of the method of FIG. 4 to be executed by one of the servers of FIG. 1 according to one embodiment of the present disclosure.

Referring now to FIG. 3, in order to be able to implement the corresponding steps of the method for notifying at least one client module implemented in a wireless device, in the various embodiments disclosed below in relationship with FIG. 4, in some embodiments the notification service device 110d comprises:
- a non-volatile memory 303 (e.g. a read-only memory (ROM), a hard disk, a flash memory, etc.);
- a volatile memory 301 (e.g. a random-access memory or RAM) and a processor 302.

The non-volatile memory 303 is a non-transitory computer-readable carrier medium. It stores executable program code instructions, which are executed by the processor 302 in order to enable implementation of some steps of the method described below (method for notifying at least one client module implemented in a wireless device) in the various embodiments disclosed below in relationship with FIG. 4.

Upon initialization, the aforementioned program code instructions are transferred from the non-volatile memory 303 to the volatile memory 301 so as to be executed by the processor 302. The volatile memory 301 likewise includes registers for storing the variables and parameters required for this execution.

The steps of the method for notifying at least one client module implemented in a wireless device may be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

Figure 4:
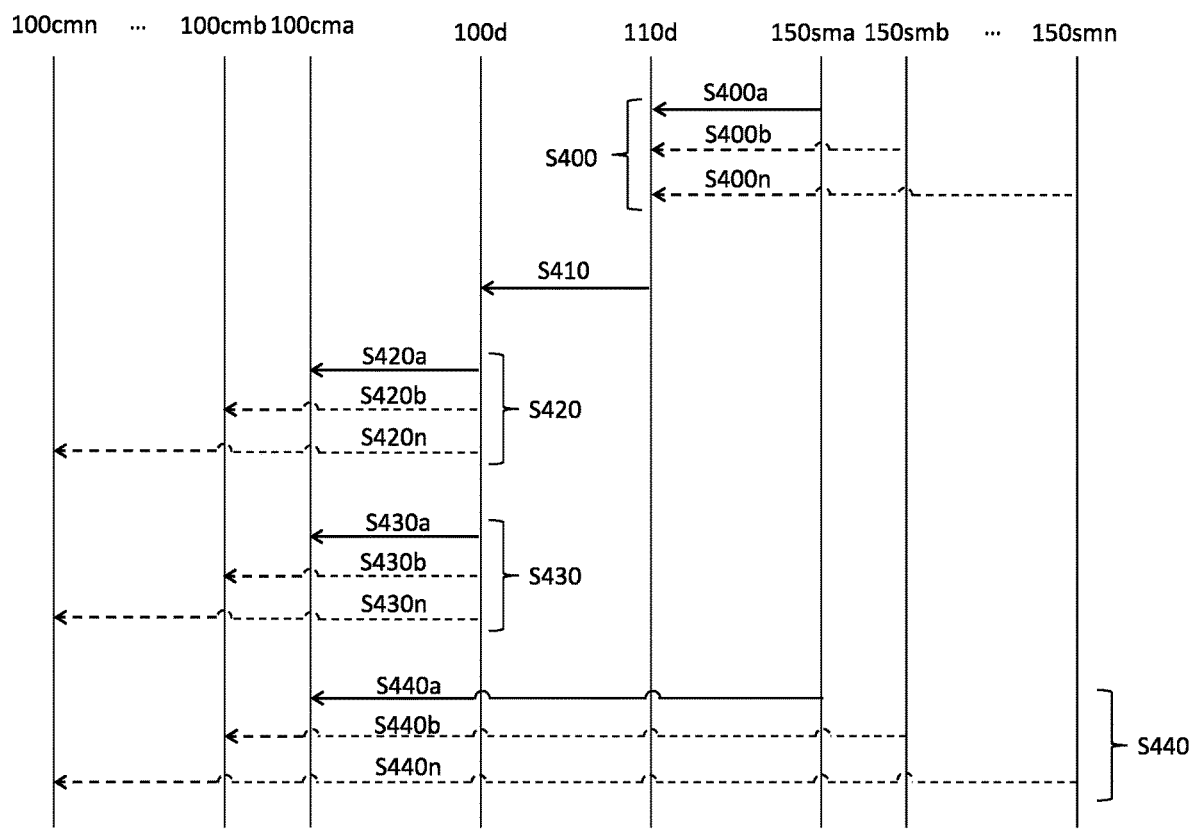
FIG. 4 illustrates a flowchart of a method for notifying at least one client module implemented in a wireless device according to one embodiment of the present disclosure.

Referring now to FIG. 4, we describe the steps of a method for notifying at least one client module implemented in a wireless device according to one embodiment of the present disclosure and taking as an illustrative example the configuration discussed above in relation with FIG. 1.

In a step S400, the notification service device 110d receives initial notifications sent by each of the service modules 150sma, 150smb, 150smc. More particularly:
- in step S400a, the notification service device 110d receives an initial notification sent by the service module 150sma;
- in step S400b, the notification service device 110d receives an initial notification sent by the service module 150smb; and
- in step S400c, the notification service device 110d receives an initial notification sent by the service module 150smc.

Such initial notification comprises information that for a respective client module 100cma, 100cmb, 100cmc implemented in the wireless device 100, respective specific data (e.g. update data) are available in a server 150a, 150b, 150c. In the present case, the notification service device 110d receives three initial notifications, e.g.:
- a first initial notification is received from the service module 150sma, the first initial notification comprising information that specific data are available in the server 150a for the client module 100cma;
- a second initial notification is received from the service module 150smb, the second initial notification comprising information that specific data are available in the server 150b for the client module 100cmb; and
- a third initial notification is received from the service module 150smc, the third initial notification comprising information that specific data are available in the server 150c for the client module 100cmc.

More generally, when a plurality of client modules 100cma, 100cmb, 100cmc is implemented in the wireless device 100, depending on the use case the notification service device 110d may receive a given number of initial notifications, e.g. over a predetermined time duration. It can be e.g.:
- only one initial notification from a given service module 150sma, 150smb, 150smc, the initial notification comprising information that for a respective client module 100cma, 100cmb, 100cmc implemented in the wireless device 100, respective specific data are available in a server 150a, 150b, 150c; or
- two (or more) initial notifications, each initial notification being sent from a respective service module 150sma, 150smb, 150smc and comprising information that for a respective client module 100cma, 100cmb, 100cmc implemented in the wireless device 100, respective specific data are available in a server 150a, 150b, 150c.

In some embodiments, the number of initial notifications received by the notification service device 110d may be the same as the number of client modules 100cma, 100cmb, 100cmc implemented in the wireless device 100. In other embodiments, the number of initial notifications received by the notification service device 110d is different than the number of client modules 100cma, 100cmb, 100cmc implemented in the wireless device 100.

Back to FIG. 4, in a step S410, the notification service device 110d sends a notification, to the notification client device 100d, such notification comprises information that, for the client module 100cma, 100cmb, 100cmc for which an initial notification has been received, respective specific data are available in a server 150a, 150b, 150c communicatively connected to the wireless communications network 120. In view of the initial notifications received in step S400, in the present case the notification comprises information that:
- specific data are available in the server 150a for the client module 100cma;
- specific data are available in the server 150b for the client module 100cmb; and
- specific data are available in the server 150c for the client module 100cmc.

Correspondingly, in step S410, the notification client device 100d receives the notification sent by the notification service device 110d.

However, in use cases discussed above wherein the notification service device 110d receives a different number of initial notifications, e.g. over a predetermined time duration, than in the embodiment of FIG. 4, the notification comprises different information. For instance:
- when the notification service device 110d receives only one initial notification from a given service module 150sma, 150smb, 150smc, the initial notification comprising information that for a respective client module 100cma, 100cmb, 100cmc implemented in the wireless device 100, respective specific data are available in a server 150a, 150b, 150c, the notification sent to the notification client device 100d comprises information that for the client module 100cma, 100cmb, 100cmc for which the initial notification has been received, specific data are available in a server 150a, 150b, 150c;
- when the notification service device 110d receives two (or more) initial notifications, each initial notification being sent from a respective service module 150sma, 150smb, 150smc and comprising information that for a respective client module 100cma, 100cmb, 100cmc implemented in the wireless device 100, respective specific data are available in a server 150a, 150b, 150c, the notification sent to the notification client device 100d comprises information that for the two (or more) respective client modules 100cma, 100cmb, 100cmc for which an initial notification has been received, respective specific data are available in a server 150a, 150b, 150c. In some use cases discussed above, the number of initial notifications received by the notification service device 110d may be the same as the number of client modules 100cma, 100cmb, 100cmc implemented in the wireless device 100. In that case, the notification sent to the notification client device 100d comprises information that for each client modules 100cma, 100cmb, 100cmc respective specific data are available in a respective server 150a, 150b, 150c. However, in other embodiments, the number of initial notifications received by the notification service device 110d is different than the number of client modules 100cma, 100cmb, 100cmc implemented in the wireless device 100.

In some embodiments discussed above in relation with FIG. 1 wherein the wireless communications network 120 is a LPWAN and wherein the notification client device 100d is implemented in the wireless connectivity system 100wm, the notification sent by the notification service device 110d to the notification client device 100d can follow a power optimized protocol usable for such notifications. It can be e.g. a eDRX (for "Extended Discontinuous Reception") and/or PSM (for "Power Saving Mode") protocol or a LoRaWAN protocol.

Back to FIG. 4, in a step S420, the notification client device 100d wakes up the one (or more) client module 100cma, 100cmb, 100cmc for which information is comprised in the notification received from the notification service device 110d in step S410. The step S420 is e.g. executed for the one (or more) client module 100cma, 100cmb, 100cmc for which information is comprised in the notification received from the notification service device 110d and that are in a sleep mode. Thus, the wake-up of the one (or more) client module 100cma, 100cmb, 100cmc is executed only when required, thus reducing further the power consumption of the wireless device.

More particularly, in view of the notification received in step S410 in the present case:
- in step S420a, the notification client device 100d wakes up the client module 100cma;
- in step S420b, the notification client device 100d wakes up the client module 100cmb; and
- in step S420c, the notification client device 100d wakes up the client module 100cmc.

However, in other use cases discussed above wherein the notification received from the notification service device 110*d* in step S410 comprise information relating to only part of the client modules 100*cma*, 100*cmb*, 100*cmc*, the notification client device 100*d* wakes up only the client modules 100*cma*, 100*cmb*, 100*cmc* for which information was received. In some embodiments, the step S420 is not executed by the notification client device 100*d*, e.g. when the client modules 100*cma*, 100*cmb*, 100*cmc* are not in a sleep mode (e.g. when a client module 100*cma*, 100*cmb*, 100*cmc* is an application actively running on a smartphone).

Back to FIG. 4, in a step S430, the notification client device 100*d* notifies the one (or more) client module 100*cma*, 100*cmb*, 100*cmc* for which information was comprised in the notification received from the notification service device 110*d* in step S410 that respective specific data are available in a server 150*a*, 150*b*, 150*c*.

More particularly, in view of the notification received in step S410 in the present case:
in step S430*a*, the notification client device 100*d* notifies the client module 100*cma* that respective specific data are available in the server 150*a*;
in step S430*b*, the notification client device 100*d* notifies the client module 100*cmb* that respective specific data are available in the server 150*b*; and
in step S430*c*, the notification client device 100*d* notifies the client module 100*cmc* that respective specific data are available in the server 150*c*.

However, in other use cases discussed above wherein the notification received from the notification service device 110*d* in step S410 comprise information relating to only part of the client modules 100*cma*, 100*cmb*, 100*cmc*, the notification client device 100*d* notifies the client modules 100*cma*, 100*cmb*, 100*cmc* for which information was received.

Back to FIG. 4, in a step S440, the client modules 100*cma*, 100*cmb*, 100*cmc* that have been notified by the notification client device 100*d* during step S430 that respective specific data are available in a server 150*a*, 150*b*, 150*c* obtain the respective specific data from the corresponding server 150*a*, 150*b*, 150*c*.

More particularly, in view of the notifications in step S430 in the present case:
in step S440*a*, the client module 100*cma* obtain the respective specific data from the server 150*a*;
in step S440*b*, the client module 100*cmb* obtain the respective specific data from the server 150*b*; and
in step S440*c*, the client module 100*cmc* obtain the respective specific data from the server 150*c*.

For instance, for obtaining the respective data, a client module 100*cma*, 100*cmb*, 100*cmc* sends a request to the corresponding server 150*a*, 150*b*, 150*c* through the wireless communications network 120. Responsive to receiving the request, the corresponding server 150*a*, 150*b*, 150*c* sends the respective data to the client module 100*cma*, 100*cmb*, 100*cmc* that sent the request. In that case, the client module 100*cma*, 100*cmb*, 100*cmc* that sent the request receives the respective data through the wireless communications network 120.

However, in some embodiments discussed above in relation with FIG. 1 wherein the wireless device 100 comprises further wireless means for allowing the connection of the wireless device 100 to a second wireless communications network, the client module 100*cma*, 100*cmb*, 100*cmc* that sent the request receives the respective data through the second wireless communications network. In such embodiments, the request for obtaining the respective data may be sent through the wireless communications network 120 or through the second wireless communications network.

The invention claimed is:

1. A method for notifying at least one client module implemented in a wireless device communicatively connected to a first wireless communications network and a second wireless communications network that is different from the first wireless communications network, that respective specific data are available in a service module implemented in a server communicatively connected to said first wireless communications network and the second wireless communications network, the method being executed at a notification client device that includes processing circuitry and is implemented in the wireless device, the method comprising:
receiving a notification via the first wireless communications network, sent by a notification service device implemented in the server communicatively connected to said first wireless communications network and the second wireless communications network, comprising information that, for the at least one client module, the respective specific data are available in the server communicatively connected to said first wireless communications network and the second wireless communications network; and
notifying the at least one client module that the respective specific data are available in the server, wherein
the wireless device comprises a wireless connectivity system configured to allow a connection of the wireless device to said first wireless communications network and the second wireless communications network,
said notification client device is implemented in said wireless connectivity system,
the at least one client module receives, via the second wireless communications network, the respective specific data from the server, and
the first wireless communications network, which is used to receive the notification, provides a lower bandwidth than the second wireless communications network, which is used to receive the respective specific data.

2. The method according to claim 1, wherein a plurality of client modules is implemented in the wireless device,
wherein said notification sent by the notification service device comprises information that, for at least two client modules, second respective specific data are available in the server communicatively connected to said first wireless communications network and the second wireless communications network, and
wherein said notifying comprises notifying each client module of the at least two client modules that the second respective specific data are available in the server.

3. A non-transitory computer-readable media storing program code instructions for implementing the method according to claim 1, when said program code instructions are executed on a computer or a processor.

4. The method according to claim 1, wherein said first wireless communications network belongs to the group comprising:
a WiFi network;
a cellular network;
a satellite broadcast network; and
a low power wide area network dedicated to internet of things.

5. The method according to claim 1, wherein the second wireless communications network belongs to the group comprising:
a WiFi network;
a satellite broadcast network; and
a cellular network.

6. The method according to claim 1, wherein
said first wireless communications network corresponds to
a low power wide area network dedicated to internet of things, and the second wireless communications network belongs to the group comprising:
a WiFi network;
a satellite broadcast network; and
a cellular network.

7. The method according to claim 1, further comprising:
waking up the at least one client module, wherein
the notifying the at least one client module that the respective specific data are available in the server is performed after waking up the at least one client module.

8. The method according to claim 1, wherein the first wireless communications network corresponds to a low power wide area network dedicated to internet of things.

9. A notification client device for notifying at least one client module implemented in a wireless device communicatively connected to a first wireless communications network and a second wireless communications network that is different from the first wireless communications network, that respective specific data are available in a service module implemented in a server communicatively connected to said first wireless communications network and the second wireless communications network, the notification client device comprising:
processing circuitry configured to:
receive a notification via the first wireless communications network, sent by a notification service device implemented in the server communicatively connected to said first wireless communications network and the second wireless communications network, comprising information that, for the at least one client module, the respective specific data are available in the server communicatively connected to said first wireless communications network and the second wireless communications network; and
notify the at least one client module that the respective specific data are available in the server, wherein
the wireless device comprises a wireless connectivity system configured to allow a connection of the wireless device to said first wireless communications network and the second wireless communications network,
said notification client device is implemented in said wireless connectivity system,
the at least one client module is configured to receive, via the second wireless communications network, the respective specific data from the server, and
the first wireless communications network, which is used to receive the notification, provides a lower bandwidth than the second wireless communications network, which is used to receive the respective specific data.

10. The notification client device according to claim 9, wherein
a plurality of client modules is implemented in the wireless device,
said notification sent by the notification service device comprises information that, for at least two client modules, second respective specific data are available in the server communicatively connected to said first wireless communications network and the second wireless communications network, and
the processing circuitry is configured to notify each client module of the at least two client modules that the second respective specific data are available in the server.

11. The notification client device according to claim 9, wherein said first wireless communications network belongs to the group comprising:
a WiFi network;
a cellular network;
a satellite broadcast network; and
a low power wide area network dedicated to internet of things.

12. The notification client device according to claim 9, wherein the second wireless communications network belongs to the group comprising:
a WiFi network;
a satellite broadcast network; and
a cellular network.

13. The notification client device according to claim 9, wherein
said first wireless communications network corresponds to
a low power wide area network dedicated to internet of things, and the second wireless communications network belongs to the group comprising:
a WiFi network;
a satellite broadcast network; and
a cellular network.

14. The notification client device according to claim 9, wherein the processing circuitry is configured to
wake up the at least one client module, and
notify the at least one client module that the respective specific data are available in the server, after waking up the at least one client module.

15. The notification client device according to claim 9, wherein
the first wireless communications network corresponds to a low power wide area network dedicated to internet of things.

16. A wireless device communicatively connected to a first wireless communications network and a second wireless communications network that is different from the first wireless communications network, the wireless device comprising:
a wireless connectivity system;
at least one client module that includes client processing circuitry; and
a notification client device for notifying the at least one client module implemented in the wireless device, the wireless device being communicatively connected to the first wireless communications network and the second wireless communications network, that respective specific data are available in a service module implemented in a server communicatively connected to the first wireless communications network and the second wireless communications network, wherein
the notification client device includes processing circuitry configured to:
receive a notification via the first wireless communications network, sent by a notification service device implemented in the server communicatively connected to said first wireless communications network and the second wireless communications network, comprising information that, for the at least one client module, the respective specific data are available in the server communicatively connected to said first wireless communications network and the second wireless communications network; and notify the at least one client module that the respective specific data are available in the server, the wireless connectivity system is configured to allow a connection of the wireless device to said first wireless communications network and the second wireless communications network, said notification client device is implemented in said wireless connectivity system, the client processing circuitry of the at least one client module is configured to receive, via the second wireless communications network, the respective specific data from the server, and the first wireless communications network, which is used to receive the notification, provides a lower bandwidth than the second wireless communications network, which is used to receive the respective specific data.

17. The wireless device according to claim 16, wherein said first wireless communications network belongs to the group comprising:
   a WiFi network;
   a cellular network;
   a satellite broadcast network; and
   a low power wide area network dedicated to internet of things.

18. The wireless device according to claim 16, wherein the second wireless communications network belongs to the group comprising:
   a WiFi network;
   a satellite broadcast network; and
   a cellular network.

19. The wireless device according to claim 16, wherein a plurality of client modules is implemented in the wireless device, said notification sent by the notification service device comprises information that, for at least two client modules, second respective specific data are available in the server communicatively connected to said first wireless communications network and the second wireless communications network, and the processing circuitry is configured to notify each client module of the at least two client modules that the second respective specific data are available in the server.

20. The wireless device according to claim 16, wherein the first wireless communications network corresponds to a low power wide area network dedicated to internet of things.

* * * * *